United States Patent [19]

Wang et al.

[11] 4,039,971

[45] Aug. 2, 1977

[54] FAST DISCHARGE, HIGH POWER, ELECTRIC DISCHARGE PUMPED GAS LASER

[75] Inventors: Charles P. Wang, Rancho Palos Verdes; Owen L. Gibb, Redondo Beach, both of Calif.

[73] Assignee: The Aerospace Corporation, El Segundo, Calif.

[21] Appl. No.: 682,929

[22] Filed: May 4, 1976

[51] Int. Cl.² .............................................. H01S 3/097
[52] U.S. Cl. ............................................. 331/94.5 PE
[58] Field of Search ........................ 331/94.5; 330/4.3

[56] References Cited

U.S. PATENT DOCUMENTS

| 3,757,248 | 9/1973 | Small | 331/94.5 PE |
|---|---|---|---|
| 3,879,681 | 4/1975 | Godard et al. | 331/94.5 PE |
| 3,893,046 | 7/1975 | Godard et al. | 331/94.5 PE |

OTHER PUBLICATIONS

Basting et al., A Simple, High Power Nitrogen Laser, Opto-Electronics, vol. 4, (1972), pp. 43–49.

*Primary Examiner*—William L. Sikes
*Attorney, Agent, or Firm*—Francis R. Reilly

[57] ABSTRACT

Laser emission from rare gas-halogen molecules, particularly krypton fluoride, is produced by a chemical reaction initiated by an efficient, high-power, high repetition-rate, fast electric discharge device transferring energy directly to a body of the gas in a laser cavity. The discharge device is of Blumlein parallel plate condensor/conductor type in which the condensor plates and their separating dielectric are uniformly compressed within an evacuated chamber by the force of the external atmospheric pressure.

6 Claims, 4 Drawing Figures

FAST DISCHARGE, HIGH POWER, ELECTRIC DISCHARGE PUMPED GAS LASER

BACKGROUND OF THE INVENTION

1. Field of the Invention

The present invention relates to pulsed, electric discharge initiated gas lasers and more particularly to a parallel plate condensor/transmission line discharging across a very high volume of the gas in the laser cavity.

2. Description of the Prior Art

Laser action in certain of the rare gas halides has in the prior art been effected by electron beam excitation. This form of excitation however has self-imposed limitations on the pulse repetition rate. This rate is limited by heating of the electron beam exit window in the wall of the generator vacuum chamber and the lack of availability of high repetition rate switching for control of the electron beam. Other pulsed gas lasers have been successfully operated by the use of high output power, electric discharge energization. One of the more promising configurations providing the electric discharge is a parallel-plate driven pulsed nitrogen laser described by Levatter and Lin, *Applied Physics Letters*, Vol. 25, No. 12 (Dec. 15, 1974). The configuration of their device is basically a modified form of the Blumlein-type traveling wave discharge device utilizing parallel-plate transmission lines.

The Blumlein-type discharge device employes a pair of coplanar conductor sheets with linear spaced apart confronting edges constituting the anode and cathode of the discharge device with the lasing gas occupying the volume in the gap between the electrodes. The discharge energy is thus directly applied to and absorbed by gas. At one side or face of the coplaner conductor plates is a coextensive grounded plate separated from the conductors by a dielectric. The conductor plates and grounded plate thus form two capacitors allowing the buildup of a high charge in each conductor plate. The grounding of one conductor plate creates a high potential differential across the gap between the electrodes resulting in a discharge across the gap.

The achievement of ideal electrical characteristics in the Blumlein-type parallel-plate transmission line/capacitor arrangement requires that the capacitor elements be firmly pressed together uniformly over their entire surface areas with the sheet of dielectric sandwiched therebetween. Lack of uniformity in the capacitor sandwich results in spot potential variations between the plates and the minimum inductance of the plates in their function as transmission lines will not be attained. Massive mechanical clamps have been used to compress the capacitor elements with some degree of success. These however are cumbersome and their assembly and disassembly involve undue effort and time. In addition, the life span of the construction is shortened as a result of corona discharge at the edges of the plates thus generating ozone, which in turn erodes the dielectric.

Even with the advantages afforded by the Levatter and Lin electric discharge apparatus, and other known systems, the lasing gas volume is limited, thereby limiting pulse power. Also, even with best available operating parameters in the electric discharge and electron beam excitation systems, lasing has not been achieved in certain rare gas-halide media, such as krypton fluoride. The controlling parameters are the rise time to peak power of the discharge in the laser cavity and uniform discharge without arcing at high pressure. The rise time to peak charge on the parallel plate condensor is additionally significant since this factor, along with the discharge time elements, govern the maximum achievable laser pulse rate.

Another laser employing the Blumlein-type discharge is discussed by Basting et al, "A Simple, High Power Nitrogen Laser", *Optoelectronics* 4 (1972) 43–44.

SUMMARY OF THE INVENTION

The present invention provides a pulsed gas laser pumped by an electric discharge characterized by the very fast discharge of energy into the gas, high pulse-repetition rate and the large volume of gas excited to laser action.

The electrical circuit employed in the present invention is a form of that known as the Blumlein type as previously described. The plate condensors are housed in an evacuatable, collapsible chamber with its interior conforming to the configuration of the condensors. When a vacuum is drawn on the chamber, its walls, by virtue of relative motion toward each other and their planar flexibility, exert a massive compressive force uniformly over the surfaces of the condensor plates and dielectric sandwiched therebetween. When the vacuum is drawn on the chamber there is the added advantage that no gas (air) inclusions are trapped in the plate-dielectric-plate condensor construction.

One principal function therefore accomplished by the invention is the provision of a condensor-conductor plate having maximum capacitance by virtue of a minimum and uniform spacing between condensor plates, and a minimum impedance in the plate serving in its role as a conductor to one electrode.

The use of the pressure differential as the primary means to compress the condensor elements into a minimum thickness sandwich affords ease of assembly and disassembly of the laser so that the parameters of the electric power supply may be varied with facility in accord with different characteristics of the laser gas selected. In addition, the use of adhesives to bond the interfaces of the condensor laminates is rendered unnecessary. The use of pressure differential as the compressive force also eliminates the need for cumbersome mechanical clamps and provides uniformity of pressure that is not readily attainable with mechanical clamps.

The present invention further provides a conductor/capacitor plate arrangement in which corona discharge is substantially eliminated, and, as air is absent from the interior of the construction, the formation of ozone, which may damage the dielectric of the condensor, is precluded.

There are other advantages inherent in the present invention that will be recognized by an understanding of the presently preferred forms shown and hereinafter described.

DESCRIPTION OF THE PREFERRED EMBODIMENTS

Figure 1:
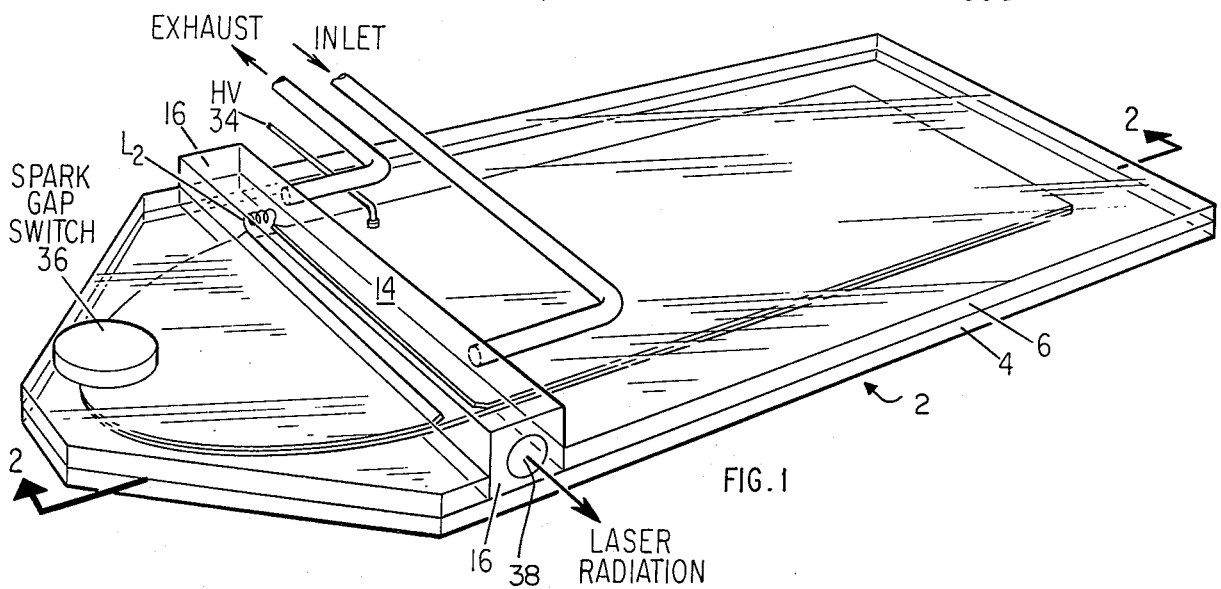
FIG. 1 is a perspective view of the electric discharge laser, with certain electrical components omitted, and with internal portions being visible by virtue of the transparency of the external casing.

One presently preferred form of apparatus constituting our invention is embodied in the generally planar assembly shown in FIG. 1. This assembly includes a hermetically sealed casing formed by a lower planar sheet 4 and an upper generally planar sheet 6 spaced apart from and parallel with lower sheet 4. The upper sheet 4 is provided with a depending peripheral flange 8 extending into sealed contact with the periphery of the lower sheet 4. A conventional endless elastomeric O-ring 9 is employed to assure a leak-proof seal at the confronting surfaces of the flange 8 and lower sheet 4 and to permit a degree of relative motion therebetween. Thus there is provided a flat cavity within casing 2. The entire casing 2 is preferably made from a flexible dielectric material, such as Plexiglas, for safety in operation of the laser and to electrically isolate the components of the laser power supply housed within.

The flat interior cavity has an enlarged rectangular cross-section portion 10 extending transversely of the upper sheet 6 and being formed by side walls 12, removable cover plate 14 and end walls 16. This portion 10 constitutes the laser cavity of the apparatus. The confronting surfaces of the cover plate 14, and the walls 12, 16 are sealed by an elastomeric O-ring and, when in place, plate 14 is is secured by fasteners (not shown). For purposes to be hereinafter defined, the laser cavity 10 is fitted with exhaust and inlet lines respectively located at opposite ends thereof.

Figure 2:
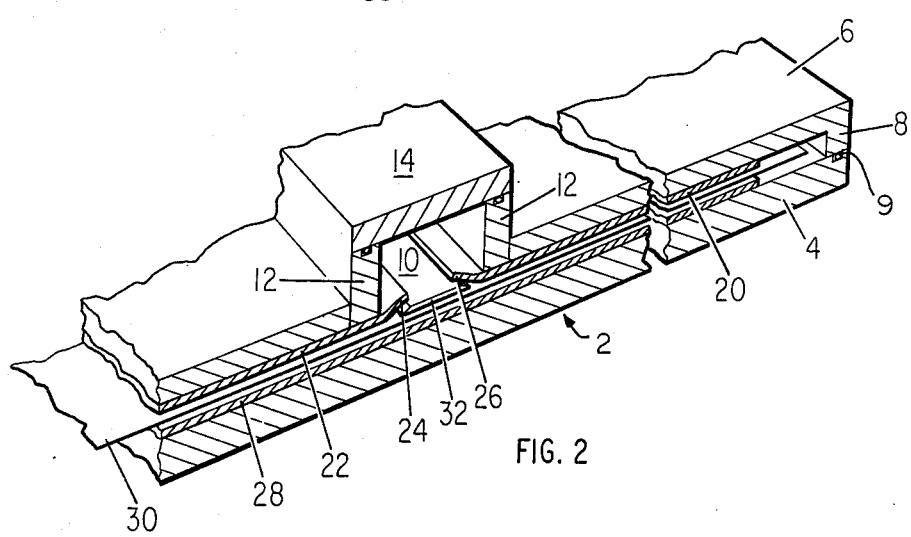
FIG. 2 is a fragmentary cross sectional view of the laser taken along lines 2—2 of FIG. 1.

The casing 2 serves to enclose the transmission lines/-condensor plates and electrodes which as shown in FIG. 2 include generally rectangular upper metal plate 20 and a second substantially triangular metal plate 22 with both plates 20, 22 being in a common plane. In practice, these plates are made from a good electrical conductor, such as copper, and typically are 0.020 inch (0.5mm.) thickness. The confronting or adjacent edges of plates 20, 22 are similarly deformed upwardly and extend within laser cavity 10. These parallel edges respectively form the anode 24 and cathode 26 of the electric discharge power supplied to the gas within cavity 10 to effect lasing.

Coextensive with metal plates 20, 22, and parallel therewith, is a lower-metal (copper) plate 28. Sandwiched between the upper plates 20, 22 and lower plate 28 is a dielectric comprising multiple sheets 30 of Mylar film, a product of E. I. Du Pont de Nemours and Company. The total thickness of the Mylar sheets is typically 0.01 in. (0.25mm) representing the thickness of 10, 1 mil thick sheets. As shown in FIG. 2 the edges of dielectric sheets 30 extend beyond the edges of the upper and lower copper plates 20, 22 and 28. In practice, in laying up sheets 30 the edges of several of them are folded back over the tops of upper plates 20, 22 and the edges of several are folded back over the bottom of lower plate 28. This method of folding back the free edges of the dielectric 30 prevents electrical arcing between the plates to enhance their functioning as capacitors. There is further added to the assembly, as shown in FIG. 2, a quartz strip 32 underlying the anode 24 and 26 to protect the adjacent portions of dielectric 30 from damage by the discharge between the electrodes.

The upper conductor/condensor plate 20 is provided with an electrical lead line 34 to a high voltage power supply. This lead line 34 passes to the exterior of housing 2 and its passage therethrough is sealed against gas leakage. Interiorly of casing 2, plate 20 is connected to the other conductor/capacitor plate 22 by inductance $L_2$. The apex of plate 22 is connected through the upper sheet 4 to a self-triggered spark gap switch 36. This switch 36 is controlled to become conducting at a predetermined potential by adjusting the pressure of its internal gaseous atmosphere, e.g. nitrogen. The other condensor component within the casing, that is, the lower plate 28, is connected to ground.

Figure 3:
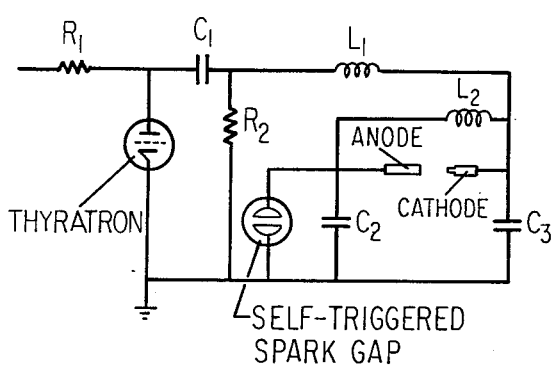
FIG. 3 is a diagram of the electrical circuit of the electric discharge power feed to the laser; and, FIG. 4 is a modified form of the invention having multi-plate or stacked condensor/conductor lines and associated electrodes.

The above described electrical elements are connected in circuit as shwon in FIG. 3. Referring to that figure, high voltage supply HV is connected through resistor $R_1$, capacitor $C_1$, inductance $L_1$ to conductor plate 20 which also serves as one plate of condensor $C_3$. Condensor $C_2$ is charged via inductance $L_2$, with the upper plate of condensor $C_2$ being plate 22. Lower copper plate 28 serves as the ground plate for condensors $C_2$ and $C_3$. Conductor plate 22 is serially connected through spark gap switch 36 to ground. The Thyratron and resistor $R_2$ are connected in circuit as shown.

After the mechanical and electrical assemblies are completed, the apparatus is conditioned for use by first evacuating the interior of casing 2 through the exhaust line. The evacuation is most effective if performed at a slow rate to assure the absence of isolated air pockets. The pressure differential thereby created causes the upper and lower sheets 4 and 6 of casing 2 to firmly and uniformly compress the conductor/condensor plates 20, 22 and 28 and the dielectric sheets 30. This compressive action makes condensorss $C_2$ and $C_3$ approach ideal electrical capacitance and minimizes their inductance. Thereafter laser cavity 10 is back-filled to sub-atmospheric pressure with the desired gas to be energized to emit laser radiation. Laser cavity 10 may be filled with a single charge of laser gas or the gas may be continuously flowed through the cavity. The laser radiation exits laser cavity 10 via the optical element 38 in end wall 16. The opposite end of the cavity is defined by an interior mirror (not shown) of appropriate radius at the other end wall 16.

In operation, the D.C. high voltage, HV, is fed to charge condensor $C_1$ to a predetermined potential. At that point in time the Thyratron is triggered by an external signal to close the circuit sending a charging wave to condensor/conductor plates 20, 22, i.e., capacitors $C_2$, $C_3$. When the voltage on $C_2$ attains a predetermined value as seleected by the gas pressure in the spark gap switch, this switch becomes conducting sending a traveling wave to the anode creating a high voltage differential between the anode and cathode. There results a fast discharge across the electrodes with the energy of the discharge pumping the laser gas to an excited level from which it relaxes and radiates at the characteristic wavelength of the gas.

In an actual construction of apparatus embodying the present invention the upper right conductor/capacitor plate 20 was 50 cm. wide, 100 cm. long and 5 mm. thick. The other conductor/capacitor plate 22 was triangular with a 50 cm. base at the anode and was 30 cm. in height. The triangular configuration is used for the conductor plate 22 to provide a smooth transition in impedance from the spark-gap switch to the anode. The active portion laser cavity 10 was 50 cm. in length, as established by the electrode length, with a height of 0.33 cm., the electrode height, with the width or electrode spacing being variable between 0.5 and 2.0 cm. by manual adjustment during assembly. The line impedance was variable between 0.04 and 0.20 ohms as a function of the thickness of dielectric 30. Laser gas pressure may be varied to an approximate maximum of 700 Torr. while, at that maximum pressure, there will still be adequate pressure differential to firmly compress the components of internal capacitors $C_2$ and $C_3$. The apparatus so constructed produced its main discharge in a period as short as 10 nanoseconds with a charging time on the order of 1 microsecond. Thus, with ample power supply and gas flow a pulse repetition rate in excess of 10 kHz is attainable.

Since atmospheric pressure is employed to clamp the sandwich construction together, the apparatus can be quickly disassembled to vary its operating parameters, e.g., electrode spacing and line impedance, by merely opening the cavity to ambient pressure. This versatile feature is most important in experimental use and when the same apparatus is used to create laser action in different gaseous media.

Examples of gases in which lasing action has been produced by the present apparatus are nitrogen, zenon fluoride and krypton fluoride. The lasing of the latter gas, krypton fluoride, is most remarkable as it is the first known successful excitation of that gas to laser emission by the use of electric discharge pumping. This action was achieved by the use of a gas mixture of He, Kr and $NF_3$ in the respective proportions of 500.50.1 at a pressure of 600 Torr., an electrode spacing of 0.6 cm., and a charging voltage of 8kV. Laser emission at 248.5 nm was observed.

Another advantageous feature of the present invention is that the associated apparatus may be scaled up in size to effect lasing in a larger volume of gas. One dimension determining such volume is its height which is a function of the electrode thickness. This thickness may be increased but only if accompanied by an increase in the number of parallel condensor/conductor plates supplying power to the electrodes. An embodiment of a multiple plate line feed is shown at FIG. 4.

Figure 4:
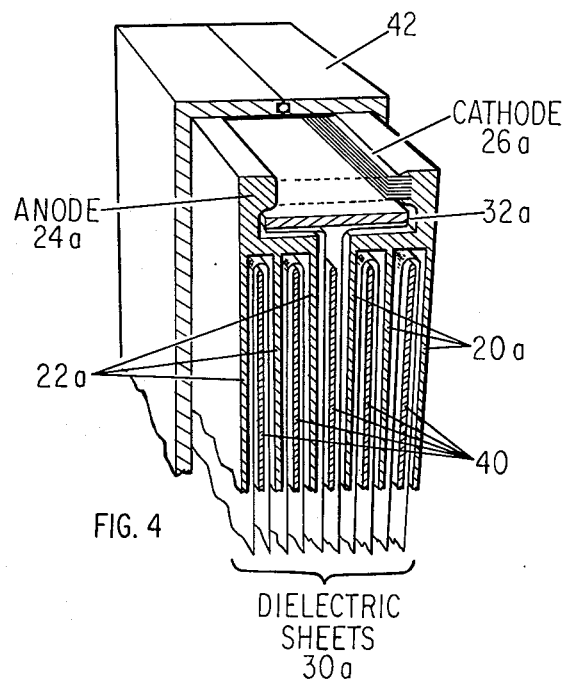

In FIG. 4, the anode 24a and cathode 26a are respectively joined with a plurality of charging plates 22a and 20a. Interposed between each adjacent parallel pair of charging plates 20a, 22a is a grounded condensor plate 40 with a dielectric 30a, preferably Mylar sheets, providing the necessary isolation between the charging plates 22a and grounded condensor plates 40. A quartz insert strip 32a is disposed between the electrode gap to shield any exposed dielectric material from damage. The planar configurations of the charging plates 20a, 22a and ground plates 40 in FIG. 4 are similar to their corresponding parts in FIG. 1. As shown, the alternate form of anode and cathode and related components in FIG. 4 is encased and compressed by atmospheric pressure on walls of outer casing 42. Such casing 42 is split into at least two sections for assembly about the interior condensor/conductor plates and electrodes. The respective sides of casing 42 are made of flexible sheets of insulating material, such as Plexiglas, whereby external atmospheric pressure deforms them into snug, planar contact with the outer confronting charging plates. The interior of the casing is communicated with gas exhaust and inlet lines, not shown, for the same purposes as such gas lines are provided in the FIG. 1 embodiment. The FIG. 4 embodiment of the invention also differs from that shown in FIGS. 1 and 2 in the planar relation of condensor/conductor plates respectively leading to the electrodes. In FIG. 1 these plates 20 and 22 are coplanar whereas in FIG. 4 a folded construction is utilized wherein plates 20a and 22a lie in generally parallel planes.

It is to be understood that the construction of the invention may be varied within the scope of the appended claims.

We claim:

1. Apparatus for imparting a high-energy, high pulse rate, electric discharge into a body of gas for producing laser action, comprising:
   a pair of substantially planar charging conductor plates, each of said pair of plates having one edge thereof conductively connected to an elongated electrode, the electrode of one plate positioned in confronting spaced apart relation with respect to the electrode of the other plate and defining a discharge gap therebetween,
   an elongated sealed chamber forming a laser cavity about the discharge gap;
   grounded conductor plate means lying in close parallel relation with at least one side of each of said first pair of plates;
   sheet dielectric means interposed between the grounded plate means and said first pair of plates whereby to form a pair of plate condensors;
   a sealed housing formed about said plate condensor and having interior walls for pressuring the grounded plate and the first pair of plates against the sheet dielectric;
   means for evacuating sealed housing whereby to create an internal-external pressure differential uniformly urging the interior walls against the plate condensors;
   means for charging the plate condensor;
   means for discharging one plate condensor whereby to induce the discharge of the other plate condensor across the gap between the electrodes; and,
   a gaseous medium within the laser cavity absorbing the energy of the discharge across the electrode gap whereby to produce laser action.

2. Apparatus as defined in claim 1 wherein the gaseous medium is a mixture of helium, krypton and nitrogen trifluoride.

3. Apparatus as defined in claim 2 wherein the gaseous medium is a mixture of He, Kr and $NF_3$ in the respective volumetric proportions of 500 . 50 . 1 at a pressure of approximately 600 Torr.

4. Apparatus as defined in claim 1 where the discharge gap is variable in width.

5. Apparatus as defined in claim 1 wherein the means for discharging the one plate condensor is a self-triggered spark gap switch having means for varying the potential whereat self-triggering is effected.

6. Apparatus as defined in claim 1 wherein each condensor comprises:
   a plurality of coplanar charging plates connected to each electrode;
   a grounded conductor plate closely paralleling each of the charging plates; and,
   sheet dielectric means interposed between the confronting surfaces of the grounded conductor plate and the charging plates whereby to form a stacked plate condensor.

* * * * *